INVENTOR.
CHARLES C. SHUMARD

INVENTOR.
CHARLES C. SHUMARD

April 4, 1961 — C. C. SHUMARD — 2,978,646
AUTOMATIC ALIGNMENT SYSTEM
Filed Aug. 21, 1957 — 6 Sheets-Sheet 5

INVENTOR.
CHARLES C. SHUMARD
BY
ATTORNEY

INVENTOR.
CHARLES C. SHUMARD
BY
ATTORNEY

United States Patent Office 2,978,646
Patented Apr. 4, 1961

2,978,646
AUTOMATIC ALIGNMENT SYSTEM

Charles C. Shumard, Hopewell, N.J., assignor to Radio Corporation of America, a corporation of Delaware Filed Aug. 21, 1957, Ser. No. 679,421

4 Claims. (Cl. 330—2)

The present invention relates to an alignment system for automatically aligning electric circuits, and more particularly to an improved system which accurately and quickly tunes resonant circuits to a predetermined frequency.

In many instances, it is necessary to align an electrical circuit to a predetermined frequency. For example, each of the radio and television receivers which are now being produced in great volume include a number of resonant circuits which must be tuned to the correct operating frequencies. Up to the present time, the alignment of such resonant circuits has been performed manually by trained operators. Each operator views the response of each resonant circuit on an oscilloscope, or on an indicating meter, and manually tunes the resonant circuit to the correct frequency as indicated by a maximum or peak response of the resonant circuit. Such an alignment procedure is inherently laborious and time consuming and requires skilled personnel to manipulate the test equipment and interpret the data obtained. While a human operator can align a single resonant circuit with good accuracy and in a relatively short period of time, when he attempts to align resonant circuits one after the other, he is unable to operate with any acceptable speed or accuracy over long periods of time. Consequently, when tunable circuits are aligned manually, the results are unreliable and non-uniform.

Attempts have been made in the past to provide automatic alignment apparatus for tuning a single resonant circuit to a predetermined resonant frequency, by observing the peak response of the circuit when excited by a signal of the predetermined frequency. However, this procedure is not satisfactory for applications such as multi-stage stagger-tuned amplifiers, wherein interstage coupling transformers are tuned to provide an overall predetermined frequency response characteristic for the amplifier. This is particularly true of television receiver picture I.F. amplifiers wherein the frequency response characteristic must be accurately controlled to prevent undesired interaction between the sound and picture signals. Furthermore, it is impractical to peak align a single resonant circuit at a time to a predetermined frequency since connections must be made directly to the individual circuits thereby introducing external effects such as loading and lead capacitance, etc., which adversely affect the tuning of the individual circuits. It is, therefore, desirable to have a fully automatic alignment system wherein the resonant circuits can be accurately, reliably, and uniformly aligned to provide the correct frequency response characteristic. Also, it is desirable to decrease the time required to tune each circuit to the correct frequency response characteristic without employing highly skilled technicians, so that more receivers can be tuned in a given period of time and the expense of operating personnel can be reduced.

It is, accordingly, an object of this invention to provide a new and improved apparatus for automatically aligning electric circuits to predetermined frequencies.

It is another object of the present invention to provide an improved automatic alignment system for tuning cascaded resonant circuits in a manner to provide a desired frequency response characteristic which is suitable for unskilled operators on a production line basis.

Still another object of this invention is to provide an improved automatic alignment system wherein a plurality of cascade resonant circuits may be aligned to a desired frequency response characteristic without requiring individual connections to each of the resonant circuits.

It is a still further object of this invention to provide an improved automatic alignment apparatus for aligning stagger-tuned electric circuits to a predetermined frequency response characteristic wherein such alignment may be accomplished by unskilled operators in a minimum amount of time on a production line basis and with a high degree of uniformity of the aligned circuits.

In accordance with the present invention the frequency response of apparatus including a plurality of tunable circuits to be aligned is sequentially measured at different selected signal frequencies. The response of the apparatus at each of the selected signal frequencies is compared with standard or reference signals representative of the desired output level at that frequency. Any difference between the measured level and that of the standard is used to control a servo system connected to automatically adjust the tuning elements of the resonant circuits. In this manner a stagger-tuned amplifier such as used in radio or television receivers can be quickly and accurately adjusted to a predetermined frequency response characteristic.

The novel features that are considered characteristic of this invention are set forth with particularity in the appended claims. The invention itself, however, both as to its organization and method of operation, as well as additional objects and advantages thereof will best be understood from the following description when read in connection with the accompanying drawings, in which:

Figure 1:
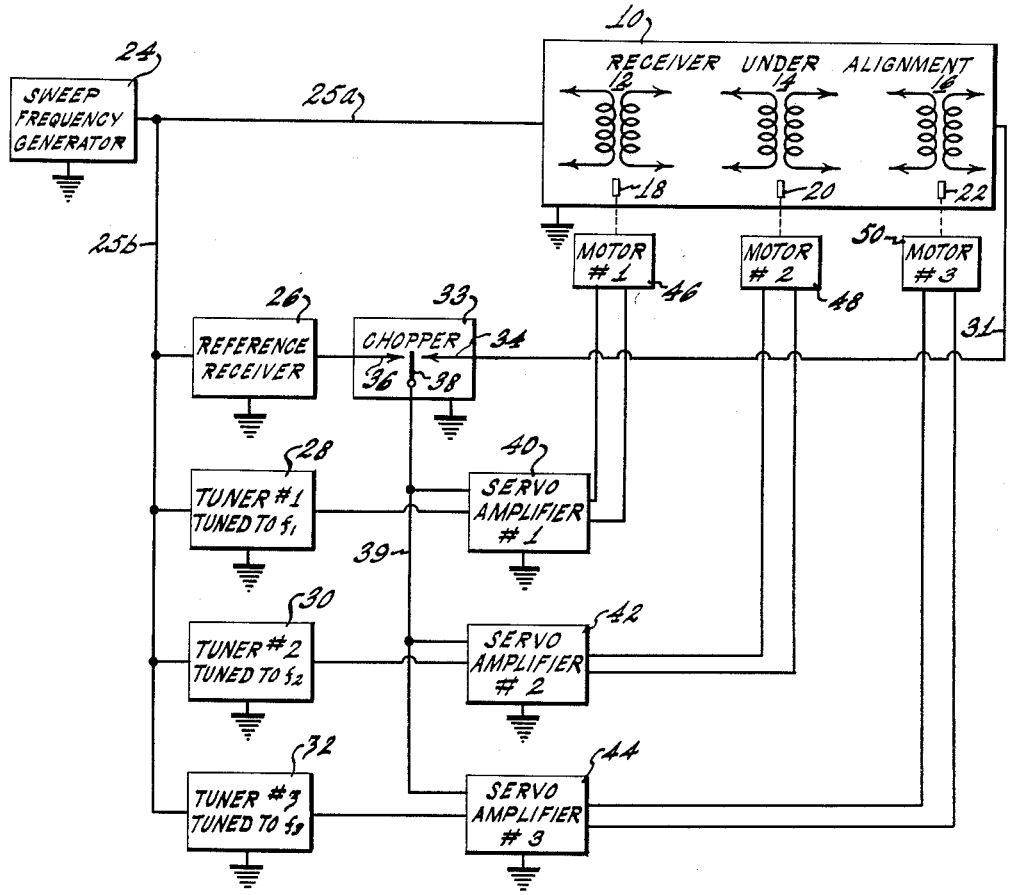
Figure 1 is a schematic circuit diagram in block form of an automatic alignment system in accordance with the invention.

Referring now to the drawings and more particularly to Figure 1 thereof, there is illustrated in block diagram form one alignment system embodying the present invention which is capable of accurately aligning cascaded resonant circuits to provide a predetermined frequency response characteristic on a fully automatic basis. The automatic alignment system is shown in connection with a modulated carrier wave receiver, such as a television receiver, indicated generally at 10, having a tuned amplifier circuit such as a stagger-tuned intermediate frequency amplifier which is to be aligned to provide a predetermined frequency response characteristic. The I.F, amplifier of the receiver 10 is indicated as having at least three interstage coupling transformers 12, 14 and 16 which are individually tunable to a desired frequency of resonance by the movable tuning slugs 18, 20 and 22.

A sweep frequency generator 24, operable to provide a signal cyclically varying in frequency over the band of frequencies to be passed by the I.F. amplifier under alignment, is connected to the receiver 10 through a conductor 25a. The sweep frequency signal from the generator 24 is also applied through a conductor 25b to a prealigned reference receiver 26, and three tuners 28, 30 and 32 each of which is tuned to a different frequency in the frequency band covered by the sweep frequency generator 24. The reference receiver 26 is a prealigned receiver having a predetermined frequency response characteristic corresponding to a predetermined standard to which it is desired to adjust the receiver 10 under alignment.

The output signals from the receivers 10 and 26 in response to the applied signal from the sweep frequency generator 24 are compared in a chopping circuit 33. The chopper 33 has a pair of fixed contact terminals 34 and 36 which are connected with respective receivers 10 and 26, and a movable element 38 which alternately makes contact with the terminals 34 and 36. The chopping circuit 33 performs the function of converting the difference in output signal levels between the receivers 10 and 26 into a square wave of proportionate amplitude and sense.

The square wave error signal from the chopping circuit 33 is applied to each of three normally blocked servo amplifiers 40, 42 and 44 by way of a conductor 39. The servo amplifiers 40, 42 and 44 are connected respectively to drive the servo motors 46, 48 and 50 which in turn control the movement of the slug tuning elements 18, 20 and 22.

In accordance with the invention, the alignment of the receiver 10 is controlled by measuring and comparing the response of the receiver at each of a finite number of signal frequencies with that of the reference receiver 26. By way of example, three signal frequencies in the band covered by the sweep frequency generator 24 are arbitrarily selected for measurement and comparison with the reference receiver 26. The three frequencies selected for comparison, $f_1$, $f_2$ and $f_3$ may be near the low frequency, center, and high frequency portions respectively of the receiver pass band. It has been ascertained that the interaction of the effects of tuning the transformers 12, 14 and 16 in the stagger-tuned intermediate frequency amplifier is such that each may be tuned to control different portions of the frequency response characteristic of the amplifier. Accordingly, by adjustment of the tuning slug 18 of the transformer 12, the frequency response at the low frequency end of the passband can be predominantly controlled. Likewise, by adjustment of the tuning slug 20 of the transformer 14, the high frequency end of the passband can be controlled and the tuning slug 22 of the transformer 16 can be used to control the tilt of the resulting frequency response characteristic.

As the sweep frequency generator 24 approaches the frequency $f_1$ to which the tuner 28 is tuned, a control signal is developed by that tuner which serves as a gating pulse to unblock the servo amplifier 40. The signals at frequency $f_1$ which are simultaneously fed to the reference receiver 26 and the receiver under alignment 10 are compared in the chopper 33. Any difference in the amplitude of the signal output of the receivers 10 and 26 is amplified in the servo amplifier 40 to drive the motor 46 which adjusts the tuning slug 18. This tunes the coupling transformer 12 to change the frequency response of the receiver 10 at the frequency $f_1$ to correspond to that of the reference receiver 26. As the sweep frequency generator 24 continues to tune cyclically over the band, and approaches the frequency $f_2$ to which the tuner 30 is tuned, the output from the tuner 28 decreases and the servo amplifier 40 returns to its normally blocked condition. However, the signal output from the tuner 30 operates to unblock the servo amplifier 42 so that any error signal at the frequency $f_2$ from the reference receiver 26 and the receiver 10 is amplified to control the motor 48. In turn, the motor 48 drives the tuning slug 20 to adjust the response of the receiver 10 under alignment at frequency $f_2$ to correspond to that from the reference receiver 26. In like manner, the tuner 32 produces a signal to actuate the servo amplifier 44 so that the response of the receiver 10 at frequency $f_3$ may be adjusted to correspond with that of the reference receiver 26. The net effect of the foregoing operations is to energize each of the three servo loops in sequence so that any error in the response of the receiver being aligned at the frequency $f_1$ is compensated by tuning of the transformer 12, and any error in the alignment at the frequency $f_2$ is compensated by tuning the transformer 14, etc.

The alignment process outlined above is repeated until the circuits of the receiver 10 are brought into precise alignment with the prealigned circuits of the reference receiver 26.

The cyclically varying rate at which the sweep frequency generator 24 covers the desired frequency range is slow enough for proper operation of the servo loop. It should be noted that fixed frequency sources may be used in the place of the sweep frequency generator 24, and may be sequentially connected with the conductors 25a and 25b by a mechanical or electronic commutator arrangement.

Although the automatic alignment system of the invention has been described in connection with the I.F. amplifier of a television receiver, it should be understood that it is applicable generally to tuned amplifiers and passive tuned circuits.

In considering the detailed circuitry of the system components briefly described above, the operation of these components will be analyzed insofar as possible in terms of the functions which they perform in tuning the resonant circuits 12, 14 and 16 to provide substantially the same response characteristic as the reference receiver 26. Before considering the details of the system components, however, it is pointed out generally that corresponding reference characters have been used throughout the drawings to identify corresponding circuit elements of the system. Unless necessary to an understanding of the operation of a particular system component, those circuit elements which perform entirely conventional functions in the circuit, namely, functions which will be readily understood by those skilled in the art, have not been identified in the drawings nor referred to in the following description of the system components.

Figure 2:
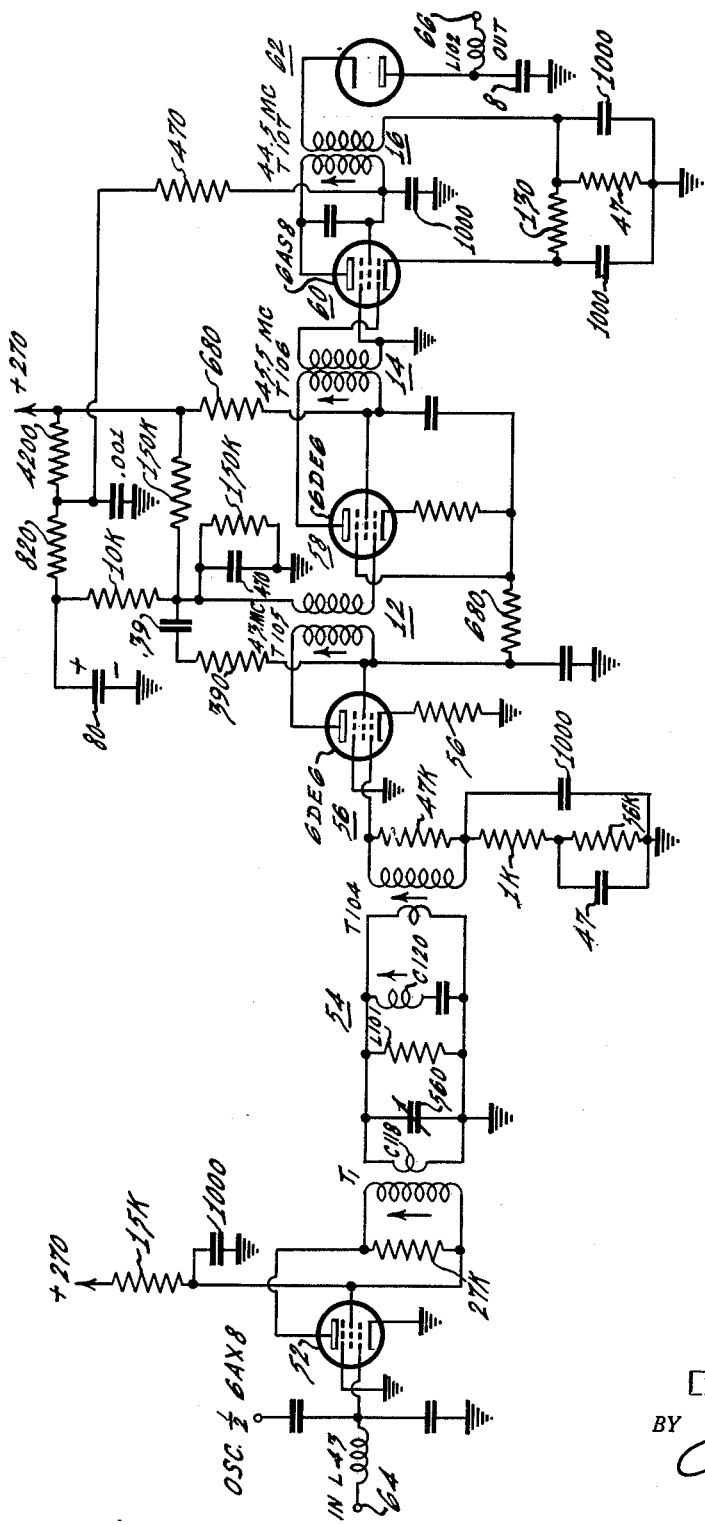
Figure 2 is a schematic circuit diagram of an intermediate frequency amplifier for television receivers which may be automatically aligned with the system of the present invention.

Figure 2 schematically illustrates a portion of a television receiver including a conventional stagger-tuned amplifier circuit of the type which may be automatically aligned by means of the apparatus described above with reference to Figure 1. In addition to the intermediate frequency amplifier, the schematic of Figure 2 shows the usual mixer stage 52 incorporated in superheterodyne receivers for converting a selected signal modulated radio frequency carrier to a corresponding intermediate frequency signal. The I.F. signal developed in the mixer output circuit is conveyed through an over-coupled passive network 54 to a stagger-tuned I.F. amplifier including three amplifier stages 56, 58 and 60 with tunable interstage coupling transformers 12, 14 and 16. These transformers may be of any suitable type such as: wound on a suitable coil form and tuned by a centrally movable tuning slug; or printed on an insulating supporting panel and tuned by eddy current disks which may be moved toward or away from the respective windings. After amplification by the I.F. amplifier, the signal is detected in a rectifier circuit 62 connected to the secondary winding of the transformer 16, which comprises the video detector stage of the television receiver 10.

The signal from the sweep frequency generator 24 is applied to the input terminal 64 which is coupled to the control grid of the mixer stage 52, and the amplified output signal from the I.F. amplifier is derived from a terminal 66 which is coupled to the anode of the video detector. The conductors 25a and 31 shown in Figure 1 are connected respectively to the terminals 64 and 66.

Figure 3:
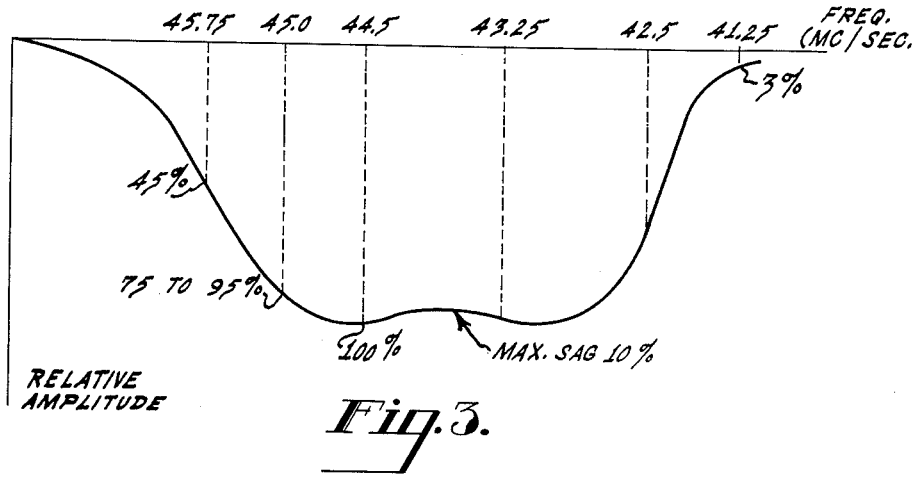
Figure 3 is a graph of a desired frequency vs. amplitude characteristic for the intermediate frequency amplifier shown in Figure 2.

An example of a desired overall frequency response curve for the stagger-tuned amplifier is shown in Figure 3 and represents a standard response for a television receiver I.F. amplifier. In this curve the frequency of an applied signal of substantially constant amplitude is indicated along the abscissa and relative amplitude of the signal appearing at the output terminal 66 is indicated on the ordinate. As shown on this curve the pass band of the intermediate frequency amplifier of Figure 2 extends over a range of frequencies from about 41 to 46 megacycles. In aligning a stagger-tuned amplifier to provide this frequency response characteristic, it is necessary to formalize the effects of the transformers 12, 14 and 16. This was found to be possible by applying the following criterion: The transformer 12 affects mainly the low frequency portion of the response curve, and is tuned to adjust the response of the amplifier for a signal input frequency of 41.6 megacycles; the transformer 14 affects mainly the high frequency portion of the response curve and is tuned to adjust the response for a signal input frequency of about 45.75 megacycles; and the transformer 16 affects the tilt of the response curve between the low and high frequency ends of the pass band and is adjusted in accordance with the response of the amplifier for a signal input frequency of about 43.25 megacycles.

As previously pointed out in the general description of the system in Figure 1, the tuners 28, 30 and 32 in the respective servo loops perform the function of providing a gating pulse which unblocks the servo amplifiers so that the error voltage output from the chopping circuit 33 may be used to drive one of the motors. The tuners are tuned to different frequencies so that only one servo loop is operable at a time. By way of example the tuners 28, 30 and 32 are tuned to 41.6, 45.75 and 43.25 megacycles respectively thereby causing the response of the amplifier under alignment to be sampled and compared at these frequencies. Since the construction of the three tuners is similar only the tuner 28 has been illustrated.

The conductor 25b from sweep frequency generator 24 is connected through an isolating resistor 70 to the input circuit of the tuner. The input circuit includes a parallel resonant circuit 72 connected between the control grid of a high frequency amplifier tube 74 and ground which in the case of the tuner 28 is designed to select signals at 41.6 megacycles applied to the input circuit thereof. The parallel resonant circuit 72 need not be sharply tuned to the center frequency thereby permitting a relatively wide gating pulse. The output circuit for the R.F. amplifier comprises a parallel resonant circuit 76 which includes the primary winding of a coupling transformer 78. The signals inductively coupled to the secondary winding of the transformer 78 are detected by the rectifier 80, and are filtered in the network 82 to provide a D.C. gating voltage of the proper polarity to overcome the blocking bias applied to the servo amplifier 40.

Figure 4:
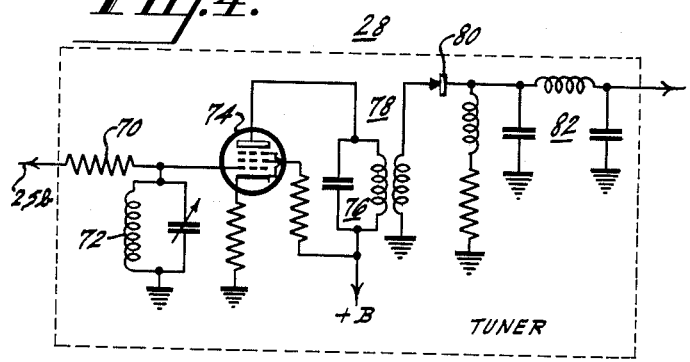
Figures 4, 5 and 6 are detailed schematic circuit diagrams of portions of the automatic alignment system shown in block form in Figure 1.

In considering the operation of the tuner shown in Figure 4, as the sweep frequency generator 24 approaches the frequency to which a particular tuner is responsive, a signal voltage is developed at the control grid of the amplifier 74 which is amplified and detected by the rectifier 80. The detected signal voltage is filtered to provide a gating pulse for the servo amplifier to which the tuner is connected. As the signal from the sweep frequency generator continues to change in frequency, the amplitude of the gating pulse gradually decreases to zero.

Figure 5:
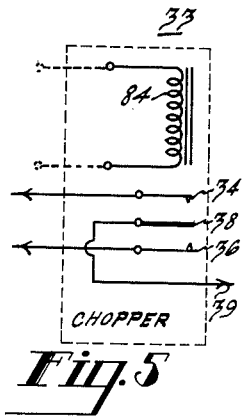

The circuit shown in detail in Figure 5 of the drawings, and, as discussed briefly in the general system of Figure 1, is provided for the purpose of converting the gradually varying output voltage from the I.F. amplifier under alignment into a square wave of corresponding amplitude and sense which may be amplified in A.C. coupled amplifiers to control the driving motors 46, 48 and 50. The chopping circuit 33 comprises a vibratory element or armature 38 which is polarized so as to be moved back and forth between the fixed contacts 34 and 36 due to the attraction and repulsion of the magnetic fields set up by an adjacent armature coil 84. The coil 84 is excited with a sinusoidal voltage from a standard frequency voltage source, not shown, so that the armature 38 is moved back and forth at a rate corresponding to the frequency of the source. The fixed contact 34 is connected via a conductor 31 to the output terminal of the receiver 10 whereas the fixed contact terminal 36 is connected with the output circuit of the reference receiver 26. The armature 38 is electrically connected over the conductor 39 to the input circuits of the servo amplifiers 40, 42 and 44 respectively.

During the operation of the chopping circuit 33, as the armature 38 is moved back and forth between the contacts 34 and 36 under the influence of the armature coil 84, the armature 38 is successively connected to the potentials at which these contacts are operated. Therefore, during periods when the contacts 34 and 36 are not at the same potential, a square wave of voltage is produced on the output conductor 39 of the chopping circuit 33 having a frequency corresponding to the frequency exciting the armature coil 84. As the receiver 10 is brought into alignment with the reference receiver 26, the potential existing on the terminal 34 approaches and becomes equal to that on the terminal 36 and therefore no variation in potential exists on the conductor 39 of the chopping circuit as the armature 38 moves back and forth between the contacts 34 and 36. Thus there is no output signal for amplification by the servo amplifiers to drive the motors.

Figure 6:
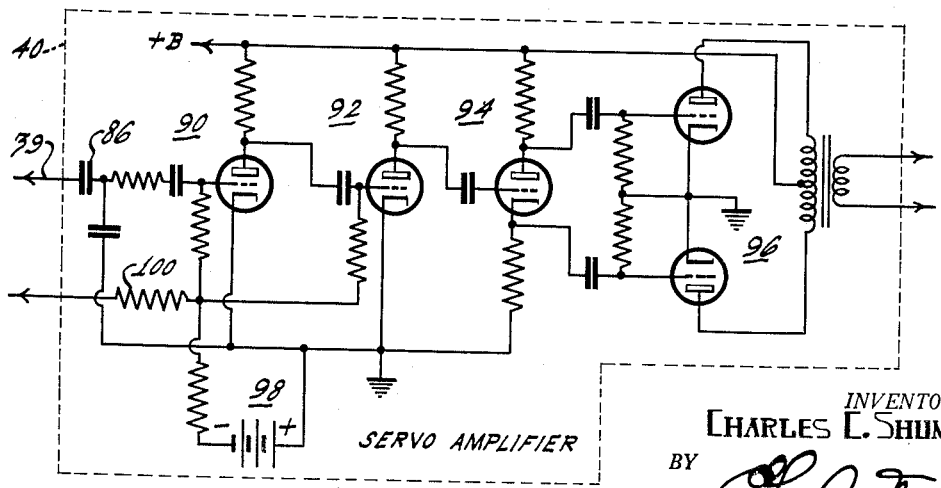

Referring now to Figure 6 of the drawings a conventional A.C. amplifier is illustrated which is designed to amplify the square wave error signal produced by the chopping circuit 33. The servo amplifier illustrated corresponds to any of the amplifiers 40, 42 or 44 shown in Figure 1. The square wave which is provided at the armature 38 of the chopping circuit 33 is applied by way of the conductor 39 and the coupling condenser 86 to the control grid of a first amplifier stage 90. A second amplifier stage 92 which is A.C. coupled to the first stage drives a phase splitter stage 94. In turn the phase splitter 94 provides a pair of 180° out-of-phase signals to a push-pull amplifier 96. The first and second A.C. amplifier stages 90 and 92 are normally biased to a nonconducting condition by a negative voltage applied to the control grids thereof. As indicated, this negative voltage is provided by a battery 98, the positive terminal of which is grounded with the negative terminal being connected through suitable current limiting resistors to the control grids of the A.C. amplifier stages 90 and 92. The output from the tuner 28 to which the servo amplifier 40 is connected is also applied to the control grids of the A.C. amplifiers 90 and 92 through an isolating resistor 100. When the tuner 28 produces a gating pulse of sufficient amplitude, the potential at the control grids of the amplifiers 90 and 92 is raised above cut-off so that the square wave signal applied from the chopping circuit 33 may be amplified by the servo amplifier 40. The field winding of the servo motor 46 is connected to the secondary winding of the push-pull amplifier 96. Thus the motor 46 is driven in accordance with the magnitude and sense of the square wave input to the servo amplifier 40. The other servo amlpifiers 42 and 44 are connected in like manner.

Figure 7:
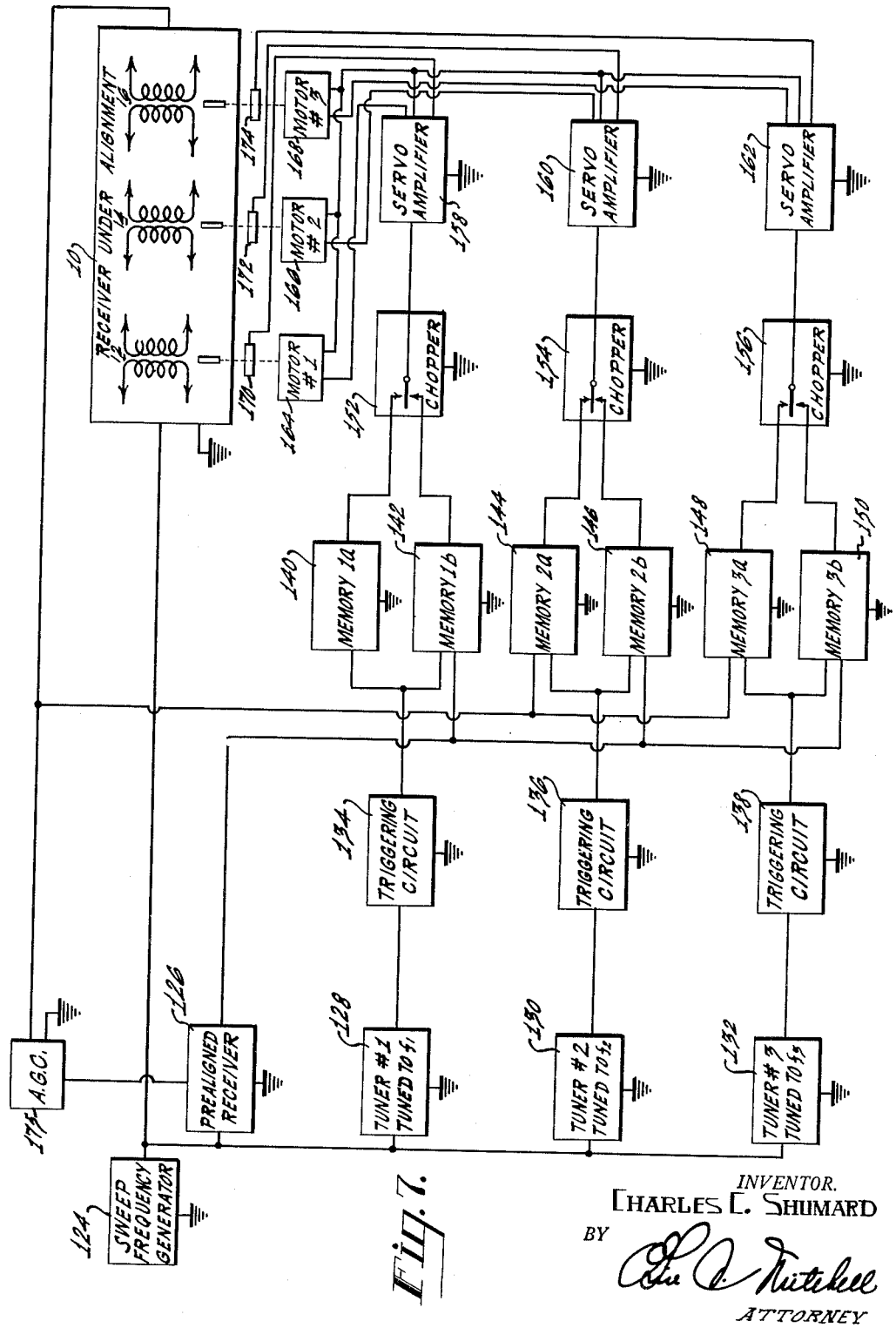
Figure 7 is a schematic circuit diagram in block form of another embodiment of an automatic alignment system in accordance with the invention.

Another embodiment of the automatic alignment system of the invention is shown in Figure 7. This system is generally similar to that shown and described in connection with Figure 1 except that means are provided whereby the relative output signals from the receiver 10 under alignment and the reference receiver 126 are stored so that the tuning motors may be continuously energized to drive the respective tuning slugs.

In this regard the sweep frequency generator 124 applies a signal cyclically varying in frequency to the receiver 10 under alignment and the pre-aligned receiver 126.

When the apparatus under alignment is an I.F. amplifier for television receivers as shown in Figure 2 and the desired frequency response therefor is shown in Figure 3, the generator 124 may be set to deliver a sweep signal which cyclically varies over the frequency range from 40 to 48 megacycles at a rate of 60 cycles per second. The signal from the generator 124 is also fed to each of three tuners 128, 130 and 132 each of which, as described above in connection with Figure 1, are in a different servo loop for tuning the transformers 12, 14 and 16. Each of the servo loops also includes a triggering circuit 134, 136 and 138 and a pair of memory circuits 140 and 142, 144 and 146, 148 and 150. One of the memory circuits in each of the servo loops is connected to the output circuit of the receiver 10, and the other is connected to the output circuit of the reference receiver 126. The memory circuits do not accept informaiton supplied by the respective receivers except when triggered by the triggering circuit connected therewith.

Each of the servo loops is also provided with a chopping circuit 152, 154 and 156. The chopping circuits include a pair of stationary contact terminals, one connected to each of the memory circuits in the respective servo loop, and a vibratory armature element. The vibratory armature element alternately engages the stationary contact terminals to produce a square wave of an amplitude corresponding to the difference in output between the receivers 10 and 26 and of a frequency corresponding to the rate of vibration of the armature. This square wave is fed to a servo amplifier 158, 160 and 162, one for each servo loop for amplification to control the driving motors 164, 166 and 168. Since the information from the memory circuits is continuously available to the chopping circuits, an error signal is available to provide continuous control of the motors until the receiver 10 is in alignment with the reference receiver 26.

A tachometer generator 170, 172 and 174 is coupled to each of the servo motors 164, 166 and 168 respectively. The tachometer output signal is summed together with the amplified chopper signal. Thus the overall servo loop including the receiver 10 is a positon servo while a velocity servo loop is obtained with the servo motor and amplifier. The amount of tachometer feedback used in each loop may be determined experimentally, and is adjusted to result in a fast and stable system.

In the quantity manufacture of electronic equipment such as receivers, the amplifier portions thereof under alignment do not always have the same gain. Accordingly, it is desirable that the frequency response characteristic be adjusted relative to the reference receiver rather than adjusted to an absolute level. To this end, an AGC circuit 175 is provided which develops a gain control potential as a function of the output level of the receiver 10. The AGC voltage is applied to the pre-aligned receiver 126 to produce an overall characteristic curve of generally the same area as that of the device under adjustment.

In considering the detailed circuitry of the automatic alignment system shown in Figures 8 to 11 and briefly described above, the operation of these components will be analyzed in terms of the functions which they perform in tuning the resonant circuits 12, 14 and 16 to provide substantially the same frequency response characteristic as the reference receiver 126.

Since the three servo loops are substantially identical except for the frequency at which the tuners produce a triggering pulse, only one of the servo loops will be described in detail. As pointed out above, each of the servo loops controls one of the motors 164, 166 and 168 which tunes the transformers 12, 14 and 16 respectively. The tuning of the transformer 12 predominately controls the low frequency response of the amplifier being aligned, the transformer 14 predominately controls the high frequency response of the amplifier being aligned, and the transformer 16 predominately controls the slope of the resulting frequency response characteristic curve. Accordingly, the tuners are tuned to different frequencies so that the memory circuits in only one of the servo loops at a time is operable to receive information from the receivers 10 and 126. By way of example, the tuners 128, 130 and 132 are operable to produce triggering pulses when the frequency of the sweep generator is at 43, 45.5 and 44.5 megacycles respectively, thereby causing the response of the amplifier under alignment to be sampled and compared at these frequencies.

Figure 8:
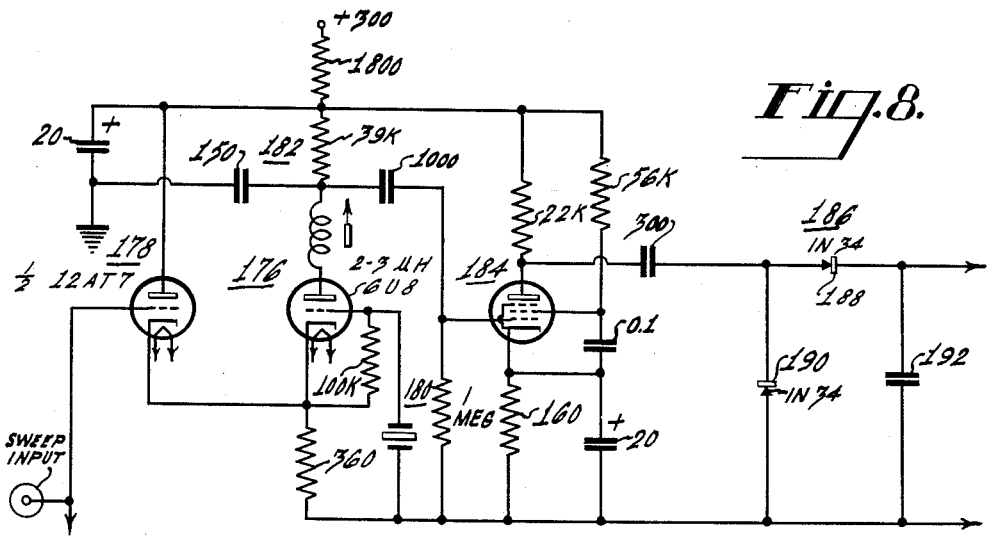
Figures 8, 9, 10 and 11 are detailed schematic circuit diagrams of portions of the automatic alignment system shown in Figure 7.

The tuners 128, 130 and 132 of the automatic alignment system of Figure 7 is shown in Figure 8. Basically, the operation of this circuit is as follows: the signal output from the sweep generator 124 is mixed with a signal from a self contained local oscillator tuned to the desired sampling frequency. The mixer output is fed through a low pass filter which transmits the zero beat of the difference frequency. The resulting burst, peaked at the beat frequency, is amplified, rectified, and integrated to form a positive pulse. This pulse is used to trigger a univibrator (triggering circuits 134, 136 and 138) which in turn provide gate pulses to operate the memory circuits.

Referring to the tuner 128, a cathode follower stage 178 which provides isolation from the other servo loops injects the sweep signal from the generator 124 at the cathode of a self oscillating converter stage 176. The frequency of the oscillator portion of the converter stage 176 is controlled by a crystal 180 at 43 megacycles for the tuner 128. For the tuners 130 and 132 the oscillator frequency should be 45.5 and 44.5 megacycles respectively. Of the many resultant frequency components present in the plate current of the converter 176 only a portion of the difference frequency containing the zero beat will appear across the plate load resistor 182. This beat burst is amplified by a pentode amplifier 184 which may for example comprise the pentode section of a 6U8 type tube.

The instantaneous value of the output voltage at zero beat can be of varying positive or negative amplitude depending upon the relative phase of the two mixed signals. This leads to an envelope whose desired positive half has an irregular peak amplitude. Accordingly, this signal is fed through a half wave doubler 186 including the rectifiers 188 and 190, so that each negative half cycle is added to each succeeding positive half cycle. The resulting transformed envelope is detected by an output capacitor 192, and is used to key the triggering circuit 134.

Figure 9:
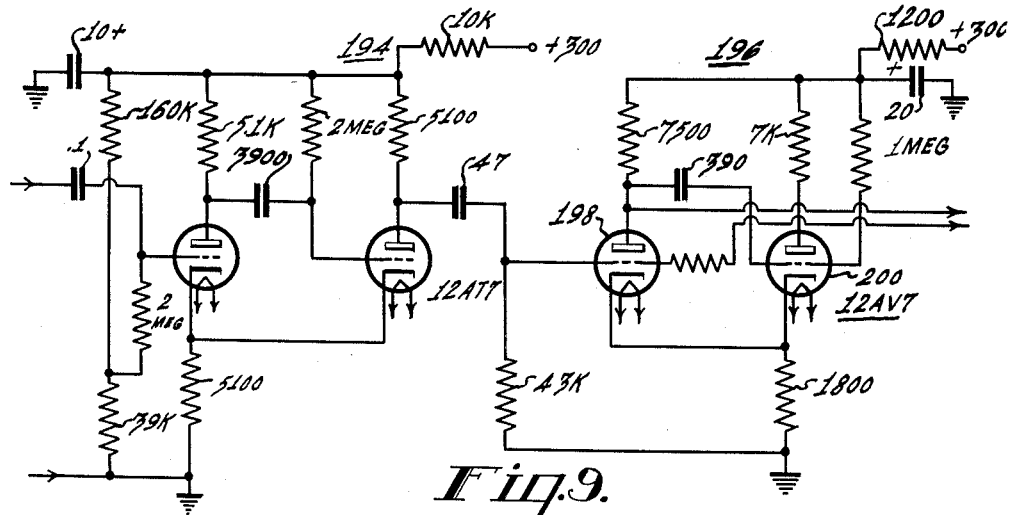
Figure 10:
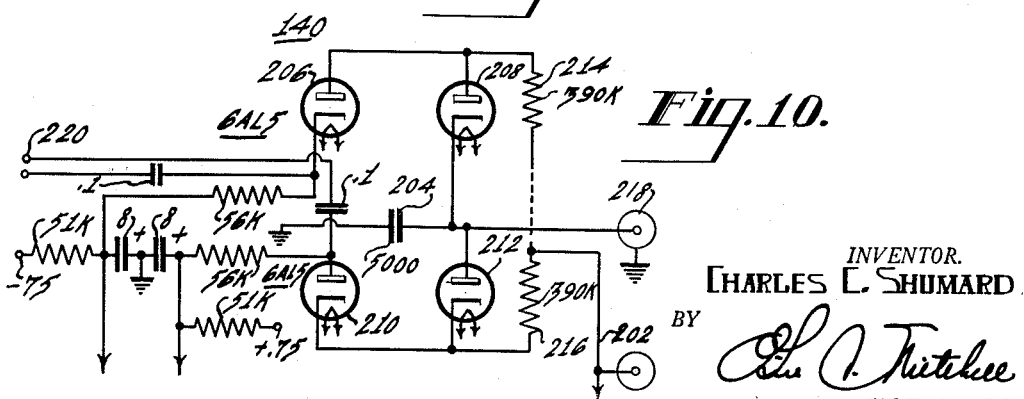

The triggering circuit 134 as shown in Figure 9 comprises a cathode coupled univibrator 194. To avoid multiple triggering on an input pulse the delay of a univibrator is made appreciably longer than the trigger pulse from the tuner 128. The level at which the univibrator 194 may be triggered can be varied by altering the grid bias on the input stage.

The output from the univibrator 194 is differentiated to provide a sharp trigger pulse for a gating univibrator 196. The time delay of the gating univibrator 196 is adjusted to give a gate width of sufficient duration to permit proper operation of the memory circuits 140 and 142. Gating pulses of opposite polarity are available from the anode circuits of the tubes 198 and 200 respectively of the univibrator 196.

The opposite polarity pulses from the gating univibrator 196 are applied to the memory circuits 140 and 142. Since the two memory circuits 140 and 142 are identical only the memory circuit 140 has been illustrated in Figure 10. The voltage to be sampled which in the case of the memory circuit 140 is the output signal from the receiver 10, and in the case of the memory circuit 142 is the output signal from the pre-aligned receiver 126 is applied to the memory circuit input terminal 202. The resultant information appearing at the input terminal 202 is stored in a memory capacitor 204 when the memory circuit is triggered by a gating pulse from the gating univibrator 196. The memory circuit includes four diodes 206, 208, 210 and 212. In the quiescent state, two bias voltages, one a negative voltage applied to the cathode of the diode 206 and the other a positive voltage applied to the anode of the diode 210 causes these diodes to conduct. The current through the diodes 206 and 210 cause a voltage to be developed across the resistors 214 and 216 which is of a polarity to maintain the diodes 208 and 212 non-conducting. When positive and negative pulses are applied respectively to the terminals 221 and 220 from the gating univibrator 196, the diodes 206 and 210 are cut-off, and the input voltage from the receiver under alignment 10 can charge the memory capacitor 204 through the diodes 208 or 212 depending upon the polarity of the input signal. For optimum operation, the contact potential of the diodes 208 and 212 should be equal. However, good results may be obtained in this respect by reducing the filament voltage of the diodes below the rated value. Under these conditions it is fairly simple to select diode tubes and to obtain output voltages equal to the input voltage to about plue or minus .01 volt. The charging time constant of the circuit including the memory capacitor 204 is longer than the gating interval so that several cycles are required to bring the capacitor up to full charge. This however, is of no disadvantage as the time constant of the servo loop is much greater than the time constant of the sampling circuit.

Figure 11:
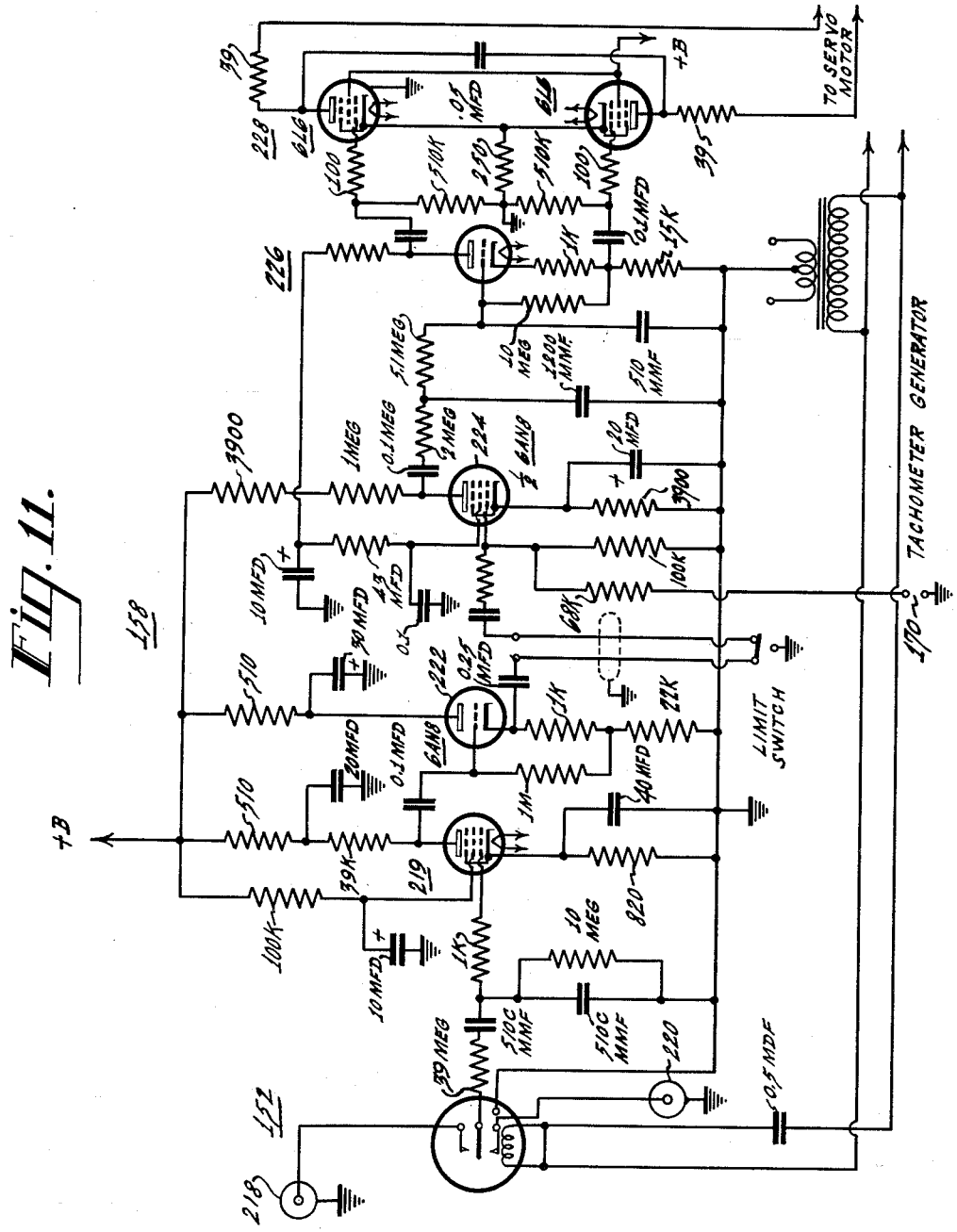

The voltage across the memory capacitor 204 is available at an output terminal 218 for application to the chopping circuit 152 which is shown in Figure 11. In like manner, the charge across the memory capacitor for the memory circuit 142 which stores the reference receiver 126 information is available at an output terminal 223 for application to the chopping circuit. The vibratory armature element of the chopper is connected to the input circuit of the servo amplifier 158.

The error signal applied to the servo amplifier 158 is amplified by a pentode amplifier 219 and coupled to a cathode follower stage 222. The signal coupling circuit between the cathode follower stage 222 and an amplifier stage 224 in the servo amplifier 158 includes a limit switch 225. In the normal operation of the system the limit switch completes the circuit between the cathode follower 222 and the input circuit for the amplifier stage 224. Each servo motor has an offset on the shaft that will operate the limit switches associated with the particular motor at either end of the normal tuning range of the tuning elements in the transformers 12, 14 and 16. At either limit the switch 225 is actuated to ground the output of a cathode follower stage so that no error signal may be developed to drive the tuning motor 164. This provides a safeguard to prevent damage to the tuning controls. The output signal from the tachometer generator is also coupled to the input circuit of the amplifier stage 224. The tachometer output signal is summed together with the amplified chopper signal. The amount of tachometer signal used in each loop varies and may be determined experimentally for best operation to provide fast and stable servo loops.

The amplifier stage 224 is coupled to a phase splitter 226 which drives a push-pull output amplifier stage 228.

The anodes of the respective tubes in the push-pull output stage 228 are connected respectively to the field winding of the motor 164, to control the position of the motor armature in accordance with the error signal applied to the servo amplifier 158.

In the operation of the automatic alignment system shown and described in connection with Figures 7 to 11, the apparatus to be aligned is first placed in an alignment fixture, and the tuning elements of the tube transformers 12, 14 and 16 are mechanically coupled to the respective servo motors 164, 166 and 168. In the first step of the aligning procedure, the three transformers are detuned mechanically by adjusting the tuning slugs to a limit by either providing a predetermined input signal through the system or by mechanically detuning prior to the insertion of the tuner into the alignment rack. In the second stage all of the servo loops are energized, and the servos will position the tuning adjustments to result in an alignment response curve shown in Figure 3 of the drawings. The alignment system of the present invention is capable of accurately positioning the three tuning slugs in about three seconds.

Specifically the output signals from the receiver under alignment and the pre-aligned receiver 126 are each continuously applied to the input terminals of a different memory circuit in each of the three servo loops. As the sweep frequency generator 124 approaches the frequency $f_1$ (approximately 43 megacycles) to which the tuner 128 is tuned, a pulse is produced which keys the triggering circuit 134. The triggering circuit in turn gates the memory circuits 140 and 142 for a predetermined time period to receive information from the receiver 10 under alignment and the pre-aligned receiver 126 respectively. This information is stored as a charge on a memory capacitor provided in each of the memory circuits, and is applied to the fixed terminals of the chopping circuit 152. When the output level of the receiver under alignment differs from the signal output from the pre-aligned receiver 126 the charge on the memory capacitors in the memory circuits 140 and 142 will be different. Accordngly an error voltage will be developed by the chopping circuit 152 which is amplified in the servo amplifier 158 to drive the motor 164. The motor 164 tunes the coupling transformer 12 to adjust the response of the receiver under alignment in the direction of the predetermined response established by the pre-aligned receiver 126.

As the sweep frequency generator cyclically continues over the frequency range and approaches the frequency $f_2$ (44.5 megacycles), the tuner 130 is activated to produce a pulse which is applied to the triggering circuit 136. In the meantime the gating pulse from the triggering circuit 134 to the memories 140 and 142 has expired so that information from the receivers no longer affects these circuits. However, the triggering circuit 136 produces gating pulses to condition the memory circuits 144 and 146 to receive information from the receiver under alignment and the pre-aligned receiver 126 in response to the 44.5 megacycle input to these receivers. Any difference in the response of these receivers is utilized to produce an error signal by means of the chopping circuit 154, which error signal is amplified by the servo amplifier 160 to drive the servo motor 166. This predominantly corrects the high frequency response of the receiver under alignment.

In like manner the tuner 132 when energized by a sweep frequency generator signal corresponding to the frequency $f_3$ (43.5 megacycles) energizes the third servo loop to tune the transformer 16 and correct the relative response between the high and low frequency ends of the receiver passband. It should be understood that the entire operation of this cycle is completed in a very short time, and standard sweep frequency generators having a 60 cycle per second sweep rate have been successfully used.

Since it is probable that the gain of the receiver under alignment may not correspond exactly with the gain of the reference receiver 126, an automatic gain control potential which is derived as a function of the output signal level of the receiver 10 is applied to control the gain of the pre-aligned receiver 126. For example, if the receiver 10 has a greater gain than normal, the pre-aligned receiver 126 gain is adjusted by means of the AGC circuit to produce a larger output so that the adjustment of the frequency response characteristic is dynamically controlled and conforms to a relative rather than a fixed standard.

The automatic alignment system of this invention quickly and accurately operates to align tuned circuits such as stagger tuned amplifiers to a predetermined frequency response characteristic by comparing the response of the receiver under alignment with a standard such as a reference receiver.

What is claimed is:

1. An automatic alignment system for aligning a tuned amplifier having a plurality of tunable circuits to a predetermined response characteristic over a desired frequency passband comprising, a sweep frequency generator operable to produce a signal cyclically varying in frequency over at least a portion of said passband, a reference amplifier pre-aligned to a predetermined frequency response, means applying the signal output from said sweep frequency generator to said tuned amplifier and said reference amplifier, a chopping circuit connected to said tuned amplifier and said reference amplifier for comparing the response of said amplifiers to signals from said sweep frequency generator and operable to produce an error signal representative of the mistuning of said tuned amplifier, a plurality of normally inoperative servo-circuits including a motor each connected to adjust the tuning of one of said tunable circuits in response to the error signal from said chopping circuit, and means for activating said servo circuits each at a different signal frequency, said different signal frequencies being provided by said sweep frequency generator.

2. An automatic alignment system for aligning a stagger-tuned amplifier having a plurality of tunable circuits to a predetermined response characteristic over a desired frequency passband comprising, a sweep frequency generator operable to produce a signal cyclically varying in frequency over at least a portion of said passband, a reference amplifier pre-aligned to a predetermined frequency response, means applying the signal output from said sweep frequency generator to said tuned amplifier and said reference amplifier, a plurality of servo circuits each connected to adjust the tuning of one of said tunable circuits, each of said servo circuits including a chopping circuit for comparing the response of said tuned amplifier to signals from said reference amplifier, each of said servo circuits including a pair of memory circuits connected to said chopping circuit, said memory circuits having normally blocked input circuits connected respectively with said tuned amplifier and said reference amplifier, each servo circuit including gating means connected to unblock said pair of memory circuits to store signal information representative of the response of said amplifiers to signals from said sweep frequency generator, the gating means in said servo circuits each being responsive to a different frequency from said sweep frequency generator to unblock the memory circuits connected therewith.

3. An automatic alignment system for aligning a plurality of tunable amplifier circuits connected in cascade relation to a predetermined frequency response characteristics comprising, means for sequentially energizing said circuits at different predetermined frequencies in the frequency range to be passed by said circuits, tuning means for individually varying the tuning of each of said tunable amplifier circuits, means providing reference signals representative of the desired response of said cascade tunable circuits at said different predetermined frequencies, means comparing the response of said cascade tunable circuits at each of said different predetermined frequencies with the corresponding reference signal for said frequencies to derive error signals, and servo control means responsive to said error signals for adjusting said tuning means.

4. An automatic alignment system for aligning a stagger-tuned amplifier having a plurality of tunable circuits, means for sequentially energizing said amplifier at different signal frequencies in the desired amplifier passband, tuning means for individually varying the tuning of each of said tunable circuits, means providing a plurality of reference potentials each respresentative of the desired response of said amplifier at said different predetermined signal frequencies, means comparing the response of said amplifier at a first of said different predetermined signal frequencies with the reference potential corresponding to the desired response of said amplifier at said first signal frequency to derive a first error signal, servo control means responsive to said first error signal for adjusting one of said tuning means, means comparing the response of said amplifier at a second of said different predetermined signal frequencies with the reference potential corresponding to the desired response of said amplifier at said second signal frequency to derive a second error signal, and servo control circuit means responsive to said second error signal for adjusting another of said tuning means.

References Cited in the file of this patent

UNITED STATES PATENTS

| | | |
|---|---|---|
| 2,251,064 | Martin et al. | July 29, 1941 |
| 2,252,058 | Bon | Aug. 12, 1941 |
| 2,376,667 | Cunningham et al. | May 22, 1945 |
| 2,465,531 | Green | Mar. 29, 1949 |
| 2,634,373 | Shostak | Apr. 7, 1953 |
| 2,719,270 | Ketchledge | Sept. 27, 1955 |
| 2,727,994 | Enslein | Dec. 20, 1955 |
| 2,753,526 | Ketchledge | July 3, 1956 |
| 2,766,384 | Prewitt | Oct. 9, 1956 |
| 2,843,747 | Ashley | July 15, 1958 |